Patented Nov. 28, 1944

2,363,858

UNITED STATES PATENT OFFICE 2,363,858

HYDROCARBON TREATMENT

Stewart C. Fulton, Elizabeth, and Thomas Cross, Jr., Union, N. J., assignors to Standard Oil Development Company, a corporation of Delaware No Drawing. Application September 28, 1939, Serial No. 296,919

6 Claims. (Cl. 260—683.5)

This invention relates to novel methods of converting hydrocarbons into desired products and includes polymerization, dehydrogenation, isomerization, and the like.

The present application is a continuation-in-part of our copending application, Serial No. 55,234, filed December 19, 1935, now Patent No. 2,204,673.

In recent years, a tremendous amount of research has been directed toward increasing the quality of gasoline and aviation fuels, particularly as regards the anti-detonation quality thereof. For instance, there has come to the fore in recent years, certain processes in which relatively high boiling hydrocarbons, such as gas oils, are subjected to catalytic cracking for the purpose of producing motor fuels, in a once throughput operation, of improved octane number. Also, various processes of catalytically reforming naphthas, either virgin or the products of a previous cracking or visbreaking operation, which reforming processes are usually carried out in the presence of added hydrogen and yield gasolines and motor fuels of high anti-detonation characteristic. The demand for aviation gasoline having a clear octane number of 100 or higher has necessitated intensive study on the part of petroleum technologists to devise methods by which such fuels could be produced on a commercial scale. It has been discovered that certain olefins, such as butylene, can be condensed with or alkylated by certain isoparaffins, such as isobutane, to form paraffins having branched chains and boiling within the motor fuel range. Since the normal supply of isobutane in the ordinary refinery is somewhat limited, it has been found necessary to rearrange or isomerize normal paraffins in order to produce isoparaffins which will react with the straight chain olefins to form branched chain paraffins. Processes have been devised which will effect this molecular rearrangement of normal paraffins to form the corresponding isoderivatives. It has been found, for example, that aluminum chloride is a highly effective catalyst in this last-mentioned type of reaction.

It is a principal object of the present invention to provide methods of catalytically reforming naphtha to produce motor fuels of improved quality.

It is another principal object of this invention to devise catalytic methods of isomerizing normal paraffins to produce isoparaffins.

It is another object of this invention to devise methods for producing an aviation fuel of low acid heat and satisfactory distillation characteristics in which processes a special type of catalyst hereinafter more fully described is employed.

To the accomplishment of the foregoing and related ends, we have discovered that anhydrous silica gel impregnated with a non-aqueous solution of aluminum chloride provides an excellent catalyst for carrying out the polymerization, isomerization, reforming, and similar hydrocarbon conversions. It is highly important to note that the catalyst must be prepared by impregnating silica gel with a solution of aluminum chloride in which the solvent is non-aqueous and non-oxygenated. That is to say, the solution of aluminum chloride used to impregnate the silica gel should be free from water or polar oxygenated solvents, such as ethyl ether, alcohol, and the like, and the silica gel before impregnation should be thoroughly free from water and moisture.

In our copending application, Serial No. 295,250, filed September 16, 1939, we have described various methods for preparing these catalysts.

The present invention will be best understood by reference to the following specific examples in which various catalytic conversions are described. It will be understood that these specific examples are purely illustrative and do not impose any limitation on the spirit of the invention since numerous modifications of these procedures will have been readily suggested to those who are skilled in this particular art after having read the said examples.

EXAMPLE 1

An East Texas heavy naphtha was contacted at a temperature of about 825° F. with a catalyst prepared by forming a silica gel according to well-known methods, thoroughly drying the said gel and thereafter impregnating 22 grams of the said gel, which may be in the form of pills, extruded lengths, granules or the like, with a solution containing 2 grams of aluminum chloride dissolved in 500 cc. of ethylene dichloride and heated to a temperature of about 200° C. to drive off the solvent and any excess aluminum chloride. The liquid product resulting from this reforming operation showed an octane number improvement of 9.0 (C. F. R.). Upon analysis, it was shown that 2.9% gas was formed, which gas consisted mainly of isobutane. This example tends to show, among other things, that the reforming of naphtha catalytically involves the isomerization of hydrocarbons.

EXAMPLE 2

The isomerization of normal butane to form isobutane was carried out as follows:

Silica gel impregnated as indicated in Example 1 except that the catalyst consisted of 76% by weight $SiO_2$ and 24% of $AlCl_3$ and also that the aluminum chloride solvent was ethyl chloride, was contacted at a temperature of 409° F. and about atmospheric pressure at a feed rate of 0.0373 liquid volume of butane per volume of catalyst per hour. An inspection of the product gave the following results:

*Particular hydrocarbons found*

| Per cent C₃ | Per cent iso-C₄ | Per cent n-C₄ | Per cent higher hydrocarbons |
|---|---|---|---|
| 0.0 | 47.3 | 49.3 | 3.4 |

EXAMPLE 3

Silica gel impregnated with an ethyl chloride solution of aluminum chloride and dried, which catalyst contained 77.6% silica gel and 22.4% aluminum chloride by weight, was contacted at 403° F. (for 180 minutes) with normal butane, the feed rate of the butane being 0.0323 liquid volume per volume of catalyst per hour, the butane feed stock containing 10% hydrochloric acid by volume. Upon analysis, the following particular hydrocarbons were found:

*Particular hydrocarbons found*

| Per cent C₃ | Per cent iso-C₄ | Per cent normal butane | Per cent higher hydrocarbons |
|---|---|---|---|
| 15.6 | 52.1 | 26.8 | 5.5 |

The foregoing examples are purely illustrative and disclose, by representative examples, methods of reforming naphtha or isomerizing paraffins generally.

As to operating conditions, of course the temperatures, pressures and feed rates will be determined by the feed stock, the desired product and other factors both as to reforming and isomerization.

In reforming naphthas the temperature employed may be from about 600° F. to 950° F. or higher, the feed rates of naphthas fed to the reaction zone may vary from 0.1 to 10 volumes of oil per volume of catalyst per hour on a cold oil basis, and the pressure may be from below atmospheric to 200 to 300 lbs. per square inch gauge. Hydrogen may be mixed with the feed stock in the amount of from 20 to 80 mol per cent hydrogen based on the total amount of feed stock and hydrogen.

As to the isomerization of the paraffins, the temperature may vary from room temperature to 800° F. or 850° F., the pressure from below normal atmosphere to superatmospheric (200 or more lbs. per square inch absolute) and the feed rate of hydrocarbons to be isomerized to the reaction zone may vary from about .01 volume of liquid hydrocarbon per volume of catalyst per hour to about 20 to 30 volumes of hydrocarbon per volume of catalyst per hour.

The inventions herein disclosed primarily relate to hydrocarbon conversions in which there is no change in the molecular weight although the conversion results in the formation of new compounds or in the reforming of naphthas which is a process very similar to the isomerization of a paraffin hydrocarbon in that branched chain paraffin hydrocarbons are formed during the reforming operation as evidenced by the resulting increase in octane number and no substantial change in the average molecular weight of the naphtha.

The underlying principle in the present invention involves the use of a special catalyst for isomerization and reforming naphthas prepared by impregnating silica gel substantially free from water with a solution of $AlCl_3$ in which the solvent is non-aqueous and non-oxygen containing. Suitable solvents are chlorinated liquid hydrocarbons.

It will be understood that in the case of isomerizing paraffins the higher the molecular weight of the hydrocarbon, the lower the temperature of the isomerization reaction should be, to avoid substantially the cracking of the hydrocarbon. For instance, in the foregoing examples, the isomerizing of normal butane was carried out at around 400° F. In converting normal pentane to iso-pentane, a temperature of around 75° F. gives good results when the feed rate is about 0.5 volume of pentane per volume of catalyst per hour. With higher hydrocarbons such as normal heptane, the isomerization to form iso-heptane may be carried out at room temperature. In any event, a few experiments will determine the best operating conditions for a particular hydrocarbon in view of the foregoing disclosure. Also varying amounts of hydrochloric acid, say 1 to 20% by volume, may be added to the feed stock to promote the isomerization reaction.

We claim:

1. The process of isomerizing a paraffin hydrocarbon which comprises contacting the said hydrocarbon at reaction temperatures with a catalyst prepared by impregnating silica gel with a solution of aluminum chloride dissolved in a liquid chlorinated hydrocarbon.

2. The method of isomerizing normally gaseous hydrocarbons which comprises contacting said hydrocarbons with a catalyst prepared by impregnating silica gel with a solution of $AlCl_3$ in a liquid chlorinated hydrocarbon solvent and heating the mass to remove the solvent.

3. The method of isomerizing normal butane which comprises contacting said butane with a catalyst formed by impregnating silica gel with a liquid chlorinated hydrocarbon solvent containing aluminum chloride and heating the gel to remove the solvent.

4. The process as set forth in claim 3 in which the isomerization is carried out at a temperature of about 400° F. and normal atmospheric pressure.

5. The process as set forth in claim 3 in which the process is carried out continuously, the feed rate of butane to the reaction zone being at least 0.1 volume of normal butane per volume of catalyst per hour and in which the temperature at which the process is carried out is about 400° F.

6. The method of isomerizing hydrocarbons which comprises contacting said hydrocarbons with a catalyst prepared by impregnating silica gel with a solution of $AlCl_3$ in a liquid chlorinated hydrocarbon solvent and heating the mass to remove the solvent.

STEWART C. FULTON.
THOMAS CROSS, Jr.